United States Patent
He et al.

(10) Patent No.: US 11,694,014 B2
(45) Date of Patent: Jul. 4, 2023

(54) LOGICAL NODE LAYOUT METHOD AND APPARATUS, COMPUTER DEVICE, AND STORAGE MEDIUM

(71) Applicant: LYNXI TECHNOLOGIES CO., LTD., Beijing (CN)

(72) Inventors: Wei He, Beijing (CN); Yangshu Shen, Beijing (CN); Yaolong Zhu, Beijing (CN)

(73) Assignee: LYNXI TECHNOLOGIES CO., LTD., Beijing (CN)

( * ) Notice: Subject to any disclaimer, the term of this patent is extended or adjusted under 35 U.S.C. 154(b) by 0 days.

(21) Appl. No.: 17/909,417

(22) PCT Filed: Aug. 17, 2021

(86) PCT No.: PCT/CN2021/112964
§ 371 (c)(1),
(2) Date: Sep. 5, 2022

(87) PCT Pub. No.: WO2022/042368
PCT Pub. Date: Mar. 3, 2022

(65) Prior Publication Data
US 2023/0089320 A1 Mar. 23, 2023

(30) Foreign Application Priority Data
Aug. 25, 2020 (CN) .......................... 202010868916.4

(51) Int. Cl.
*G06F 30/392* (2020.01)
*G06F 30/33* (2020.01)
(52) U.S. Cl.
CPC ............ *G06F 30/392* (2020.01); *G06F 30/33* (2020.01)

(58) Field of Classification Search
USPC ........................................................ 716/119
See application file for complete search history.

(56) References Cited

U.S. PATENT DOCUMENTS

| 2010/0161793 | A1* | 6/2010 | Young Hwan | .......... G06F 15/16 709/224 |
| 2020/0371759 | A1* | 11/2020 | Sastry | ................... G06F 30/343 |

(Continued)

FOREIGN PATENT DOCUMENTS

| CN | 101035023 A | 9/2007 |
| CN | 106339350 A | 1/2017 |

(Continued)

OTHER PUBLICATIONS

WIPO, International Search Report dated Oct. 25, 2021.

*Primary Examiner* — Mohammed Alam
(74) *Attorney, Agent, or Firm* — Li & Cai Intellectual Property (USA) Office (57) ABSTRACT

The disclosed method is applicable to a many-core system. The method includes: acquiring multiple pieces of routing information, each of which includes two logical nodes and a data transmission amount between the two logical nodes; determining a piece of unprocessed routing information with a maximum data transmission amount as current routing information; mapping each unlocked logical node of the current routing information to one unlocked processing node, and locking the mapped logical node and processing node, wherein if there is an unlocked edge processing node, the unlocked logical node is mapped to the unlocked edge processing node; and returning, if there is at least one unlocked logical node, to the step of determining the piece of unprocessed routing information with the maximum data transmission amount as the current routing information.

12 Claims, 6 Drawing Sheets

(56) References Cited

U.S. PATENT DOCUMENTS

2020/0371787 A1* 11/2020 Gupta .................. G06F 8/41
2020/0372123 A1* 11/2020 Gupta .................. G06F 7/57

FOREIGN PATENT DOCUMENTS

| CN | 110955463 A | 4/2020 | | |
|---|---|---|---|---|
| CN | 111985181 A | 11/2020 | | |
| WO | WO-2022042368 A1 * | 3/2022 | ............. | G06F 30/32 |

* cited by examiner

LOGICAL NODE LAYOUT METHOD AND APPARATUS, COMPUTER DEVICE, AND
STORAGE MEDIUM

CROSS-REFERENCE TO RELATED APPLICATIONS

The present application is a National Phase Application filed under 35 U.S.C. 371 as a national stage of PCT/CN2021/112964, filed on Aug. 17, 2021, an application claiming priority from Chinese Patent Application No. 202010868916.4, filed on Aug. 25, 2020 in the Chinese Intellectual Property Office, contents of which are hereby incorporated herein by reference in their entirety.

TECHNICAL FIELD

Embodiments of the present disclosure relate to the computer technology, specifically relates to the technical fields of neural networks and artificial intelligence, and in particular relates to a logical node layout method and apparatus, a computer device, and a storage medium.

BACKGROUND

With the continuous development of computer technology, various many-core systems (such as chips) have been developed. The processing node (which may also be referred to as compute core), as the most basic compute elements in a many-core system, performs important functions such as logical operation, control processing, memory access, and interconnecting communication. A many-core system is generally laid with a plurality of processing nodes connected to each other via a network-on-chip, to achieve effective transmission of data over the many-core system.

In the related art, the logical nodes (e.g., computation subtasks) are statically laid out in the many-core system. That is, the logical nodes are laid out at processing nodes in the many-core system in advance, and positions of the logical nodes are not further adjusted after the layout. Since one logical node may need data computed by other logical nodes, data transmission is performed between corresponding processing nodes.

In implementation of the present disclosure, the inventor has found that in the related art, no effective layout of the logical nodes in the many-core system is provided, and as a result, throughout the network-on-chip, some processing nodes have a too large data transmission amount therebetween, while some other processing nodes have an unsaturated data transmission amount, which prevents the routing at each position of the many-core system from fully exerting the maximum efficiency, and reduces the processing efficiency of the many-core system.

SUMMARY

Embodiments of the present disclosure provide a logical node layout method and apparatus, a computer device, and a storage medium, to provide a layout mode of logical nodes in a many-core system to improve the processing efficiency of the whole many-core system.

In a first aspect, an embodiment of the present disclosure provides a logical node layout method applicable to a many-core system. Among a plurality of processing nodes of the many-core system, the processing nodes located at an edge of a network-on-chip are edge processing nodes, and the remaining processing nodes are internal processing nodes. The method includes: acquiring multiple pieces of routing information, each of which includes two logical nodes and a data transmission amount between the two logical nodes; determining a piece of unprocessed routing information with a maximum data transmission amount as current routing information; mapping each unlocked logical node of the current routing information to one unlocked processing node, and locking the mapped logical node and processing node, wherein if there is an unlocked edge processing node, the unlocked logical node is mapped to the unlocked edge processing node; and returning, if there is at least one unlocked logical node, to the step of determining the piece of unprocessed routing information with the maximum data transmission amount as the current routing information.

In some embodiments, in the step of mapping each unlocked logical node of the current routing information to one unlocked processing node, if there is an unlocked edge processing node located at a corner of the network-on-chip, the unlocked logical node is mapped to the unlocked edge processing node located at the corner of the network-on-chip.

In some embodiments, the step of mapping each unlocked logical node of the current routing information to one unlocked processing node includes: mapping, if the current routing information includes two unlocked logical nodes, the two unlocked logical nodes to two unlocked processing nodes based on positions of the unlocked processing nodes, respectively; and/or mapping, if the current routing information includes one unlocked logical node and one locked logical node, the unlocked logical node to one unlocked processing node based on a position of the unlocked processing node and a position of the processing node where the locked logical node is located.

In some embodiments, the step of mapping the two unlocked logical nodes to two unlocked processing nodes based on positions of the unlocked processing nodes includes: mapping, if there are at least two unlocked edge processing nodes, the two unlocked logical nodes to two closest unlocked edge processing nodes, respectively; and/or mapping, if there is only one unlocked edge processing node, one of the unlocked logical nodes to the unlocked edge processing node, and mapping the other unlocked logical node to an unlocked internal processing node closest to the unlocked edge processing node; and/or mapping, if there is no unlocked edge processing node, the two unlocked logical nodes to two closest unlocked internal processing nodes, respectively.

In some embodiments, the step of mapping the unlocked logical node to one unlocked processing node based on the position of the unlocked processing node and the position of the processing node where the locked logical node is located includes: mapping, if there is at least one unlocked edge processing node, the unlocked logical node to an edge processing node closest to the processing node where the locked logical node is located; and/or mapping, if there is no unlocked edge processing node, the unlocked logical node to an internal processing node closest to the processing node where the locked logical node is located.

In some embodiments, the unlocked logical node is an unmapped logical node to be mapped; and the unlocked processing node is an empty processing node without any logical node.

In some embodiments, the unlocked logical node is a preset logical node which is mapped to the processing node in advance; and the unlocked processing node includes a preset processing node with the preset logical node.

In some embodiments, the step of mapping each unlocked logical node of the current routing information to one unlocked processing node includes: moving, if the unlocked logical node is mapped to the preset processing node with the preset logical node, the preset logical node to another unlocked processing node.

In some embodiments, the step of mapping each unlocked logical node of the current routing information to one unlocked processing node includes: mapping, if the current routing information includes two unlocked logical nodes and the two unlocked logical nodes are located in two edge processing nodes spaced by a distance less than or equal to a preset threshold, the two unlocked logical nodes to the edge processing nodes where the two unlocked logical nodes are located, respectively.

In a second aspect, an embodiment of the present disclosure provides a logical node layout apparatus applicable to a many-core system. Among a plurality of processing nodes of the many-core system, the processing nodes located at an edge of a network-on-chip are edge processing nodes, and the remaining processing nodes are internal processing nodes. The apparatus includes: a routing information acquisition module configured to acquire multiple pieces of routing information, each of which includes two logical nodes and a data transmission amount between the two logical nodes; a current routing determination module configured to determine a piece of unprocessed routing information with a maximum data transmission amount as current routing information; a mapping module configured to map each unlocked logical node of the current routing information to one unlocked processing node, and lock the mapped logical node and processing node, wherein if there is an unlocked edge processing node, the unlocked logical node is mapped to the unlocked edge processing node. If there is at least one unlocked logical node, the current routing determination module is enabled to work.

In a third aspect, an embodiment of the present disclosure provides a computer device, including a memory, a processor and a computer program stored in the memory and executable on the processor. The processor, when executing the computer program, implements the logical node layout method according to any embodiment of the present disclosure.

In a fourth aspect, an embodiment of the present disclosure provides a computer-readable storage medium having a computer program stored thereon which, when executed by a processor, causes the logical node layout method according to any embodiment of the present disclosure to be implemented.

DETAIL DESCRIPTION OF EMBODIMENTS

The present disclosure will now be further described in detail below in conjunction with the drawings and exemplary embodiments. It will be appreciated that the specific embodiments described here are used only for the purpose of explaining the present disclosure instead of limiting the present disclosure. It should be further noted that, for the convenience of description, only some portions related to the present disclosure, but not the entire structure, are shown in the drawings.

It should be further noted that, for the convenience of description, only some portions related to the present disclosure, but not the entire contents, are shown in the drawings. Before discussing the exemplary embodiments in greater detail, it should be noted that some exemplary embodiments are described as processes or methods depicted as flowcharts. Although a flowchart may describe the operations (or steps) as a sequential process, many of the operations can be performed in parallel, concurrently, or simultaneously. In addition, the order of the operations may be rearranged. The process may be terminated when its operations are completed, but could have additional steps not included in the drawings. The processes may correspond to methods, functions, procedures, subroutines, subprograms, and the like.

Firstly, in order to facilitate understanding of the present disclosure, a brief description of an implementation concept of the present disclosure will be given.

As mentioned above, a many-core system includes a plurality of processing nodes, which may be connected to each other via a network-on-chip to implement data interaction between any two processing nodes. Generally, data interaction can be directly performed between two adjacent processing nodes, while data interaction between two non-adjacent processing nodes is indirectly performed through forwarding by one or more relay processing nodes. The inventor has found that in order to ensure a smaller number of relays via the processing nodes, a processing node closer to a middle position of a network-on-chip is more likely to be selected as a relay processing node to forward data, that is, throughout the data computation and processing, the processing node at the middle position will be frequently used as a relay processing node to forward data.

Meanwhile, when a computation task (e.g., a neural network) is laid out in a many-core system, the computation task is divided into a plurality of computation subtasks, and a corresponding computation subtask (e.g., a layer of the neural network) is assigned to each processing node in the many-core system. Therefore, the computation subtask is also referred to as logical node, and the above assignment process includes mapping (laying out) logical nodes to corresponding processing nodes.

At this time, since the computation task is preset, the data transmission amounts between the logical nodes may also be preset. In the related art, since there is no effective logical node layout mode, there may be a situation in which a logical node with a larger data transmission amount is laid out at a central position of the network-on-chip, while a logical node with a smaller data transmission amount is laid out at an edge position of the network-on-chip. In this case, the processing node at the middle position bears not only heavy data transmission tasks, but also heavy data relay tasks, resulting in a too high routing load, while the processing node at the edge position neither transmits a large amount of data, nor is preferentially selected as a relay processing node. Therefore, the routing loads at different positions are in an unsaturated state.

Based on this, the inventor creatively proposes: a new mode of introducing the data transmission amount of the logical nodes as a layout reference factor during the node layout process, in which a logical node with a larger data transmission amount is preferentially laid out at the edge position of the network-on-chip, and a logical node with a smaller data transmission amount is preferentially laid out at the central position of the network-on-chip, so that each processing node can achieve routing load balance to the maximum degree.

In a first aspect, the present disclosure provides a logical node layout method applicable to a many-core system. Among a plurality of processing nodes of the many-core system, the processing nodes located at an edge of a network-on-chip are edge processing nodes, and the remaining processing nodes are internal processing nodes.

The many-core system includes a plurality of processing nodes (compute cores) connected to each other via the network-on-chip.

Since each processing node has a preset position in the many-core system, the network-on-chip has a set physical shape, such as a matrix shape, a star shape, or a honeycomb shape.

Apparently, the network-on-chip is not limited to a 2D mesh, but may include, for example, a complicated 3D structure.

In the network-on-chip, some of the processing nodes are located at an edge of the network-on-chip, that is, these processing nodes are the "outermost" processing nodes of the network-on-chip graph, which are referred to as edge processing nodes. The other processing nodes except the edge processing nodes are referred to as internal processing nodes.

Regardless of the shape of the network-on-chip, when an internal processing node of the network-on-chip is used as a relay processing node, the number of relays is generally reduced. Therefore, in cooperative data processing by the processing nodes in the many-core system, the frequency of an internal processing node serving as a relay processing node in the network-on-chip is much higher than that of an edge processing node as the relay processing node.

Figure 1:
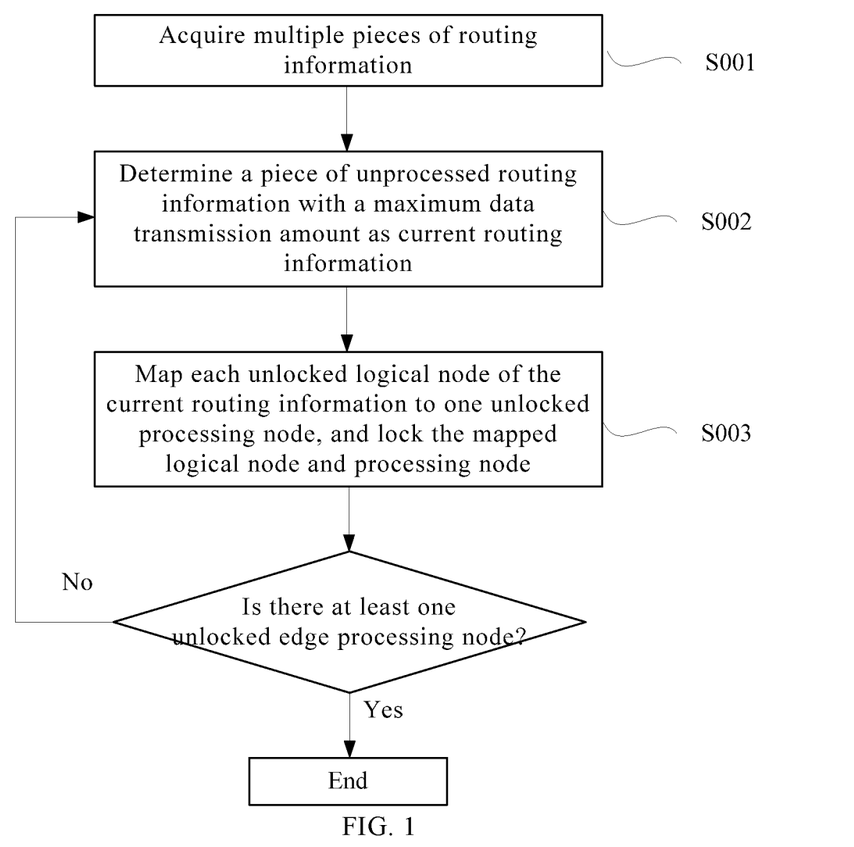
FIG. 1 is a flowchart illustrating implementation of a logical node layout method according to the present disclosure.

Referring to FIG. 1, a method according to the present disclosure includes the following steps S001 to S003.

At S001, acquiring multiple pieces of routing information.

Each piece of routing information includes two logical nodes and a data transmission amount between the two logical nodes.

When a computation task is to be laid out in a many-core system, the computation task is divided into a plurality of computation subtasks (logical nodes), each of which is assigned (mapped) to a processing node.

At this time, since the computation task is known, the data transmission amounts between the logical nodes are also known. In other words, multiple pieces of routing information can be determined after the logical nodes are determined, and each piece of routing information records two logical nodes where data interaction may occur, and a data amount to be transmitted (i.e., data transmission amount) between the two logical nodes.

The data transmission amount between two logical nodes may be a total amount of data transmitted bidirectionally between the two logical nodes, or may be an amount of unidirectional data transmitted from one of the logical nodes (source logical node) to the other (target logical node).

In this step, the routing information of different combinations of the logical nodes is acquired according to conditions of the logical nodes.

It will be appreciated that typically, any one of the logical nodes does not only transmit data with another logical node, but with a plurality of other logical nodes. That is, one logical node may belong to multiple pieces of routing information at the same time, and a same logical node may be included in different pieces of routing information.

At S002, determining a piece of unprocessed routing information with a maximum data transmission amount as current routing information.

All pieces of routing information are sorted in an order with the data transmission amounts from large to small, and a piece of unprocessed routing information with the maximum data transmission amount is selected from the unprocessed routing information as the current routing information for subsequent processing.

It will be appreciated that when the subsequent processing is completed, the routing information is no longer "unprocessed" routing information.

At S003, mapping each unlocked logical node of the current routing information to one unlocked processing node, and locking the mapped logical node and processing node; and returning, if there is at least one unlocked logical node, to the step of determining the piece of unprocessed routing information with the maximum data transmission amount as the current routing information.

If there is an unlocked edge processing node, the unlocked logical node is mapped to the unlocked edge processing node.

If the current routing information contains an unlocked logical node, the unlocked logical node is mapped to an unlocked processing node; and after the mapping, the logical node and the processing node are "locked". That is, from now on, the logical node is no longer an unlocked logical node and cannot be remapped to other processing nodes, while the processing node is no longer an unlocked processing node and other logical nodes cannot be mapped to this processing node.

The above mapping of the unlocked logical node should satisfy: as long as there is an unlocked edge processing node, the unlocked logical node is mapped to the unlocked edge processing node, instead of an unlocked internal processing node.

Apparently, if there is no unlocked logical node in the current routing information any more (i.e., both logical nodes are locked in previous cycles), this step is directly completed.

After this step is completed, if there is any unlocked logical node in any piece of the routing information, the method returns to step S001, where the current routing information is reselected to assign the unlocked logical node.

Apparently, if there is no unlocked logical node any more, which means that the assignment of all logical nodes is completed, the process can be ended without waiting for all pieces of routing information to be processed once.

In the embodiments of the present disclosure, multiple pieces of routing information corresponding to the logical nodes in the many-core system are acquired, and each unlocked logical node in the multiple pieces of routing information is mapped to an unlocked edge processing node according to an order of the multiple pieces of routing information with the data transmission amounts from large to small, and as long as there is an unlocked edge processing node, the logical node is mapped to the unlocked edge processing node. Therefore, the effect that "a logical node with a larger data transmission amount is preferentially mapped to an edge processing node" is achieved, and based on the conclusion that a layout position of a processing node in the network determines a usage frequency of the processing node in data transmission, an inventive mode for logical node layout in the many-core system according to the data transmission amounts of the logical nodes is proposed, so that different parts of the network-on-chip have a relatively uniform data transmission amount, which makes full use of the efficiency of the routing at each position of the many-core system, and thus improves the processing efficiency of the whole many-core system.

In some embodiments, if there is an unlocked edge processing node located at a corner of the network-on-chip, the unlocked logical node is mapped to the unlocked edge processing node located at the corner of the network-on-chip.

As an implementation of the present disclosure, when there is an unlocked processing node at a corner of the network (which is an edge processing node since the corner is a part of the edge), the logical node is mapped to the unlocked edge processing node at the corner. Since the "corner" is an extreme case of the edge, it has an even lower probability of serving as a relay processing node.

In some embodiments, the step of mapping each unlocked logical node of the current routing information to one unlocked processing node (S003) includes the following steps S0021 to S0022.

At S0021, mapping, if the current routing information includes two unlocked logical nodes, the two unlocked logical nodes to two unlocked processing nodes based on positions of the unlocked processing nodes, respectively.

At S0022, mapping, if the current routing information includes one unlocked logical node and one locked logical node, the unlocked logical node to one unlocked processing node based on a position of the unlocked processing node and a position of the processing node where the locked logical node is located.

If both logical nodes of the current routing information are unlocked, how to assign the two logical nodes may be determined according to positions of current unlocked processing nodes in the network-on-chip.

If only one of the two logical nodes of the current routing information is unlocked and the other is locked (in a previous cycle), then the position of the locked logical node should also be considered when determining how to assign the unlocked logical node.

Apparently, if neither of the two logical nodes of the current routing information is unlocked, (i.e., both logical nodes are locked in previous cycles), the step is directly ended.

In some embodiments, the step of mapping the two unlocked logical nodes to two unlocked processing nodes based on positions of the unlocked processing nodes (S0021) includes at least one of the following steps S00211, S00212 or S00213.

At S00211, mapping, if there are at least two unlocked edge processing nodes, the two unlocked logical nodes to two closest unlocked edge processing nodes, respectively.

At S00212, mapping, if there is only one unlocked edge processing node, one of the unlocked logical nodes to the unlocked edge processing node, and mapping the other unlocked logical node to an unlocked internal processing node closest to the unlocked edge processing node.

At S00213, mapping, if there is no unlocked edge processing node, the two unlocked logical nodes to two closest unlocked internal processing nodes, respectively.

When two unlocked logical nodes in the current routing information need to be mapped, if there are a plurality of unlocked edge processing nodes, the two unlocked logical nodes may be mapped to two unlocked edge processing nodes as close as possible.

If there is only one unlocked edge processing node available, one of the logical nodes is mapped to the edge processing node, while the other is mapped to an internal processing node closest to the edge processing node.

If there is no unlocked edge processing node left, the two unlocked logical nodes are mapped to two unlocked internal processing nodes closest to each other.

In the embodiments of the present disclosure, a distance between the processing nodes is based on the "shortest transmission step" between two processing nodes, that is, based on the shortest path in all paths connecting the two processing nodes in the network-on-chip, rather than a linear physical distance between the two processing nodes.

It will be appreciated that if two processing nodes are directly connected, the distance between the two processing nodes is the shortest, or the two processing nodes are referred to as "adjacent".

Therefore, in all assignment schemes, if the logical nodes can be mapped to adjacent processing nodes, the resulted distance is obviously the "shortest distance".

In some embodiments, the step of mapping the unlocked logical node to one unlocked processing node based on the position of the unlocked processing node and the position of the processing node where the locked logical node is located (S0022) includes the following steps S00221 and S00222.

At S00221, mapping, if there is at least one unlocked edge processing node, the unlocked logical node to an edge processing node closest to the processing node where the locked logical node is located.

At S00222, mapping, if there is no unlocked edge processing node, the unlocked logical node to an internal processing node closest to the processing node where the locked logical node is located.

When there is only one unlocked logical node in the current routing information needs to be mapped (the other logical node in the current routing information has been mapped and locked in a previous cycle), if there is an unlocked edge processing node, the logical node is mapped to the edge processing node which is closest to the processing node (which is also an edge processing node; since there is an unlocked edge processing node left, the previously mapped logical node is obviously located in an edge processing node) where the locked logical node in the current routing information is located.

If there is no unlocked edge processing node, the logical node is mapped to the internal processing node closest to the processing node (which may be an edge processing node or an internal processing node) where the locked logical node in the current routing information is located.

It will be appreciated that as long as the condition that "as long as there is an unlocked edge processing node, the logical node is mapped to the unlocked edge processing node" is satisfied, the specific mapping mode of the logical node may vary. For example, instead of mapping to the "closest" processing nodes as in the above steps S00211 to S00213, and steps S00221 and S00222, other modes such as random mapping may be adopted.

In some embodiments, the unlocked logical node is an unmapped logical node to be mapped, and the unlocked processing node is an empty processing node without any logical node.

As an implementation of the present disclosure, each logical node may be "unmapped" in an initial state, and each processing nodes may be "empty" in the initial state. That is, unmapped logical nodes are mapped to empty processing nodes, for example, n unmapped logical nodes are mapped to n empty processing nodes.

In some embodiments, the unlocked logical node is a preset logical node which is mapped to the processing node in advance; and the unlocked processing node includes a preset processing node with a preset logical node.

As an implementation of the present disclosure, each logical node may be "mapped to a logical node" in the initial state, so that at least some of the processing nodes are "mapped with logical nodes" (apparently, some of the processing nodes may be empty without any processing node), and according to the method of the present disclosure, the original mapping is "modified" or "adjusted", i.e., a logical node is "moved" from the processing node where the original mapping is located to a new processing node.

It will be appreciated that the presence of "original mapping" does not mean that the logical node or the processing node is locked. In other words, a logical node and a processing node are "locked" only when the logical node is mapped to the processing node according to the method of the present disclosure.

It will be appreciated that in the method of the present disclosure, it is actually also possible that a logical node is mapped to the processing node where it is originally located, or "not moved".

In some embodiments, the step of mapping each unlocked logical node of the current routing information to one unlocked processing node (S003) includes the following step S0023.

At S0023, moving, if the unlocked logical node is mapped to a preset processing node with a preset logical node, the preset logical node to another unlocked processing node.

As an implementation of the present disclosure, when an unlocked logical node is mapped to (or moved to) a preset processing node with a preset logical node, the original preset logical node in the preset processing node should also be "moved" to another unlocked processing node, so as to avoid a situation where more than one logical node is present in one processing node.

It will be further appreciated that if the preset logical node is moved to another preset processing node, an original preset logical node in the another preset processing node should be further "moved".

In some embodiments, the step of mapping each unlocked logical node of the current routing information to one unlocked processing node (S003) includes the following step S0024.

At S0024, mapping, if the current routing information includes two unlocked logical nodes and the two unlocked logical nodes are located in two edge processing nodes spaced by a distance less than or equal to a preset threshold, the two unlocked logical nodes to the edge processing nodes where the two unlocked logical nodes are located, respectively.

As an implementation of the present disclosure, if both unlocked logical nodes of the current routing information are located in edge processing nodes, and a distance (for example, the shortest transmission step) between the two edge processing nodes is less than a preset threshold, the two unlocked logical nodes may be directly mapped to the edge processing nodes where the two unlocked logical nodes are originally located, or "not moved".

Some specific examples of the logical node layout method according to the present disclosure are described in detail below.

Figure 2:
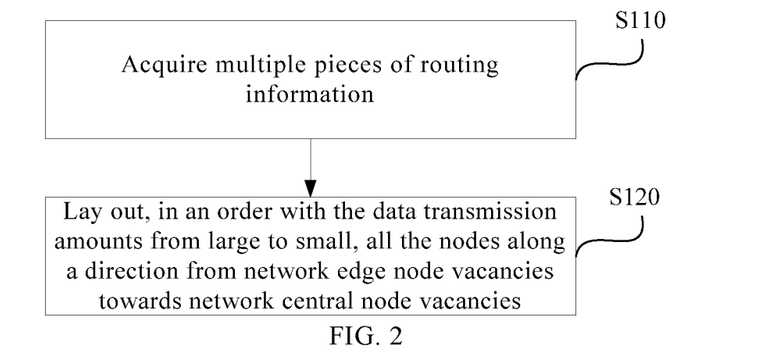
FIG. 2 is another flowchart illustrating implementation of a logical node layout method according to the present disclosure.

FIG. 2 is another flowchart illustrating implementation of a node (i.e., logical node, similarly hereinafter) layout method according to the present disclosure. This method may be adapted to lay out nodes in node vacancies (i.e., processing nodes, similarly hereinafter) of a chip (i.e., many-core system, similarly hereinafter) according to data transmission amounts of the nodes, where each node vacancy is not laid with any node. The method may be implemented by a node layout apparatus, which may be implemented in software and/or hardware, and may generally integrated in a computer device with a data computation function.

In this embodiment, the chip for layout includes a plurality of nodes and a plurality of node vacancies, and each node is correspondingly laid out in one of the node vacancies to form a transmission network.

Generally speaking, the layout position of each node vacancy in the chip is configured reasonably. That is, the position of each node vacancy in the chip is preset. Further, communication can be carried out between adjacent node vacancies. The node vacancy refers to a compute core in a chip that is configured to perform a data computation task. Accordingly, the method according to present disclosure includes the following steps S110 to S120.

At S110, acquiring multiple pieces of routing information.

In a specific example, after a computation task is laid out in a chip in advance, corresponding computation subtasks are assigned to nodes in the chip, respectively. At this time, since the computation task is known, the data transmission amounts between the nodes are also known. In other words, after each node in the chip is assigned with a specific computation subtask, multiple pieces of routing information may be determined, where each piece of routing information records two nodes where data interaction occurs therebetween, and a data amount to be transmitted (i.e., data transmission amount) therebetween.

Accordingly, the routing information further includes: a source node that sends data, a target node that receives the data, and a data transmission amount between the source node and the target node.

At S120, laying out, in an order with the data transmission amounts from large to small, all the nodes along a direction from network edge node vacancies (edge processing nodes, similarly hereinafter) towards network central node vacancies (internal processing nodes, similarly hereinafter).

In an implementation, the step of laying out, in an order with the data transmission amounts from large to small, all the nodes along a direction from network edge node vacancies towards network central node vacancies (i.e., step S120) may include: sorting all pieces of routing information in an order with the data transmission amounts from large to small, and sequentially acquiring a current routing information according to the sorted result; acquiring a current source node and a current target node in the current routing information, and laying out the current source node and the current target node along the direction from network edge node vacancies towards network central node vacancies; and returning to sequentially acquiring the currently processed routing information according to the sorted result, until all the nodes are laid out.

In this implementation, all pieces of routing information may be firstly sorted in an order with the data transmission amounts from large to small, and then the corresponding source node and target node are sequentially acquired and laid out according to the sorted routing information, until all the nodes are laid out in the chip.

In another implementation, the step of laying out, in an order with the data transmission amounts from large to small, all the nodes along a direction from network edge node vacancies towards network central node vacancies (i.e., step S120) may include: sorting all pieces of routing information in an order with the data transmission amounts from large to small; and sequentially and respectively acquiring, according to the sorted result, the source node and the target node from each piece of routing information, and adding all source nodes and target nodes to a node set without overlapping, to obtain a node set corresponding to all the nodes in the chip. The source node and the target node belonging to the same routing information are identified in the node set; and according to an order of the nodes in the node set and the routing information relationship among the nodes, the nodes are laid out along the direction from network edge node vacancies towards network central node vacancies.

In this implementation, after all pieces of routing information are sorted in an order with the data transmission amounts from large to small, a layout order of the nodes is obtained based on the sorted result, and the nodes are laid out based on the layout order of the nodes.

Figure 3A:
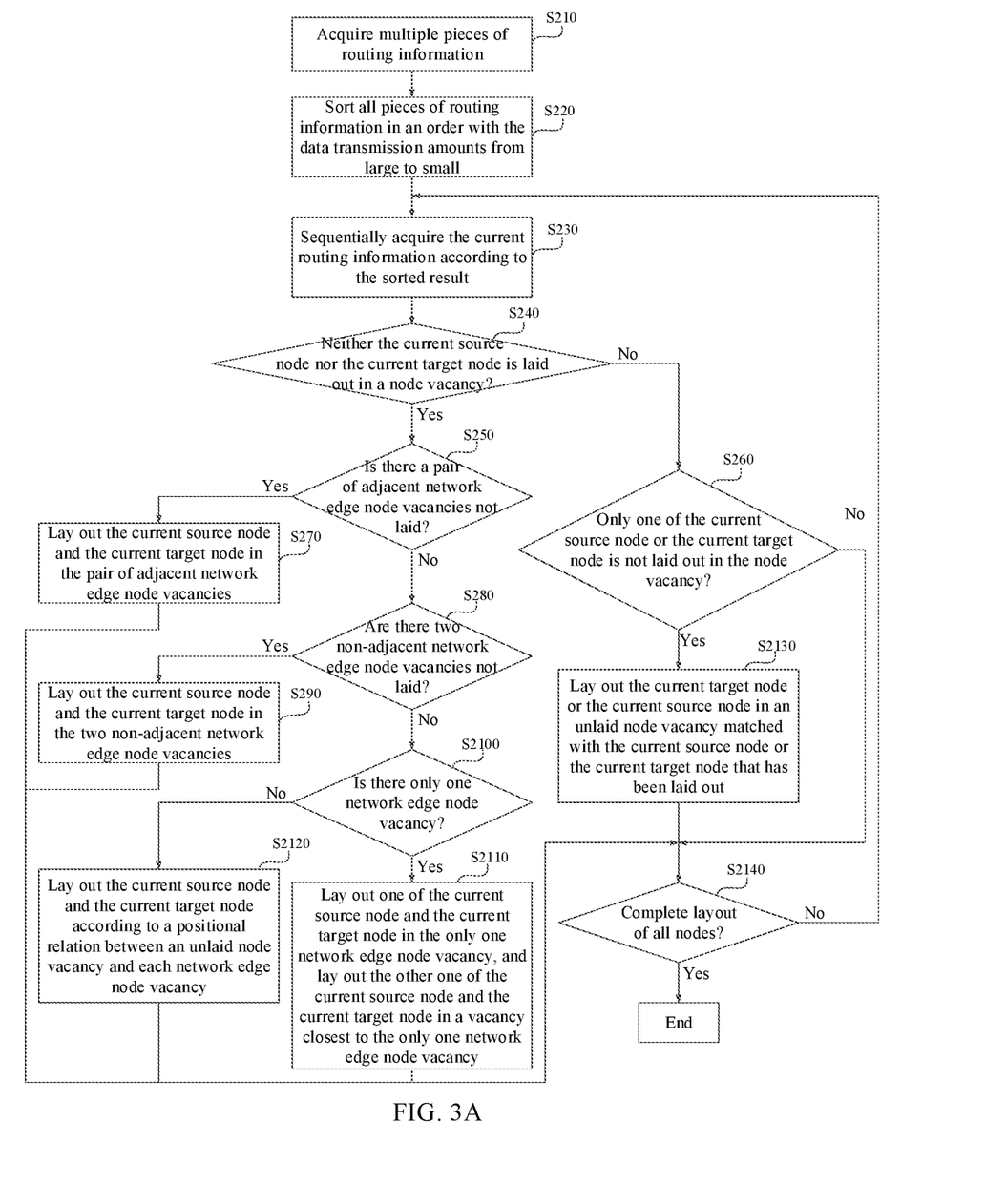
FIG. 3A is another flowchart illustrating implementation of a logical node layout method according to the present disclosure.

FIG. 3A is another flowchart illustrating implementation of a node layout method according to the present disclosure, which is refined on the basis of the above embodiments. In this embodiment, the step of laying out, in an order with the data transmission amounts from large to small, all the nodes along a direction from network edge node vacancies towards network central node vacancies (i.e., step S120) is refined. Accordingly, the method according to the embodiment specifically includes the following steps S210 to S2140.

At S210, acquiring multiple pieces of routing information.

The routing information includes: a source node that sends data, a target node that receives the data, and a data transmission amount between the source node and the target node.

At S220, sorting all pieces of routing information in an order with the data transmission amounts from large to small.

At S230, sequentially acquiring a current routing information according to the sorted result.

At S240, judging whether neither the current source node nor the current target node is laid out in a node vacancy, if neither the current source node nor the current target node is laid out in a node vacancy, proceeding to S250; otherwise, proceeding to S260.

At S250, judging whether there is a pair of adjacent network edge node vacancies not laid, if there is a pair of adjacent network edge node vacancies not laid, proceeding to S270; otherwise, proceeding to S280.

In this embodiment, if it is determined that neither the current source node nor the current target node is laid out in a node vacancy, the layout process needs to lay out both nodes into corresponding node vacancies. Since the layout is performed along the direction from network edge node vacancies towards network central node vacancies, it may be detected first whether there are network edge node vacancies for layout of the above two nodes.

It will be appreciated that the smaller the distance between the current source node and the current target node to be laid out is, the smaller number of relays will be involved in the data transmission between the current source node and the current target node, and the higher the transmission efficiency will be. Therefore, it is considered that the current source node and the current target node are preferentially laid out adjacently. Thus, it may be first judged whether there is a pair of adjacent network edge node vacancies not laid.

Figure 3B:
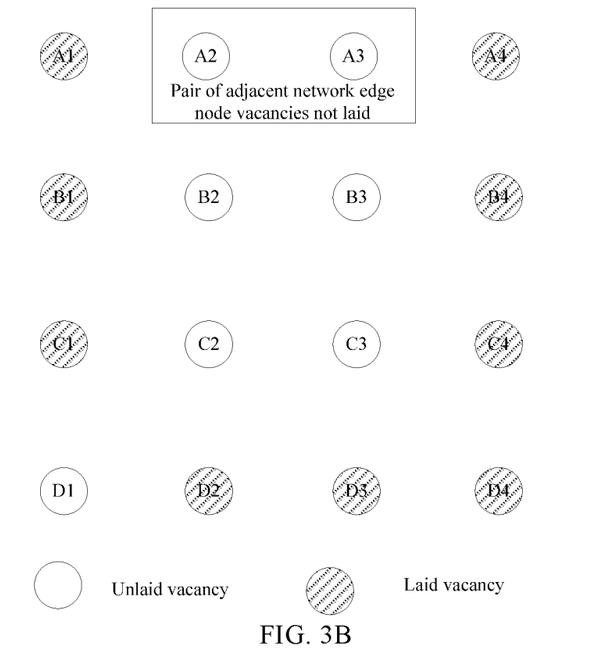
FIG. 3B is a schematic diagram of an application scenario of a logical node layout process to which the present disclosure is applicable.

The pair of adjacent network edge node vacancies specifically refers to two adjacent network edge node vacancies. FIG. 3B is a schematic diagram of an application scenario of a node layout process to which the present disclosure is applicable. As shown in FIG. 3B, the two node vacancies A2 and A3 are a pair of adjacent network edge node vacancies.

If multiple pairs of adjacent network edge node vacancies are detected in the current unlaid node vacancies, the pair of adjacent network edge node vacancies may be selected randomly, or determined by selecting clockwise or counterclockwise taking a set node vacancy as a reference fixed point, for layout of the current source node and the current target node.

At S260, judging whether only the current source node or the current target node is not laid out in the node vacancy, if only the current source node or the current target node is not laid out in the node vacancy, proceeding to S2130; otherwise, proceeding to S2140.

In this embodiment, if one of the current source node or the current target node is already laid out in the node vacancy, only the other node not laid out needs to be laid out, and the layout method at this time may refer to S2130.

At S270, laying out the current source node and the current target node in the pair of adjacent network edge node vacancies, and proceeding to S2140.

The layout method may include laying out the current source node first and then the current target node; or laying out the current target node first and then the current source node; which is not limited in the present disclosure.

At S280, judging whether there are two non-adjacent network edge node vacancies, if two non-adjacent network edge node vacancies are present, proceeding to S290; otherwise, proceeding to S2100.

Continue to the previous example, if neither the current source node nor the current target node is laid out in the node vacancy, and there isn't a pair of adjacent network edge node vacancies, it is further detected whether both the current source node and the current target node can be laid out in network edge node vacancies, that is, whether there are two non-adjacent network edge node vacancies. If there are two non-adjacent network edge node vacancies, the current source node and the current target node may be laid out in the network edge node vacancies; otherwise, the nodes needs to be laid out inside of the transmission network.

Figure 3C:
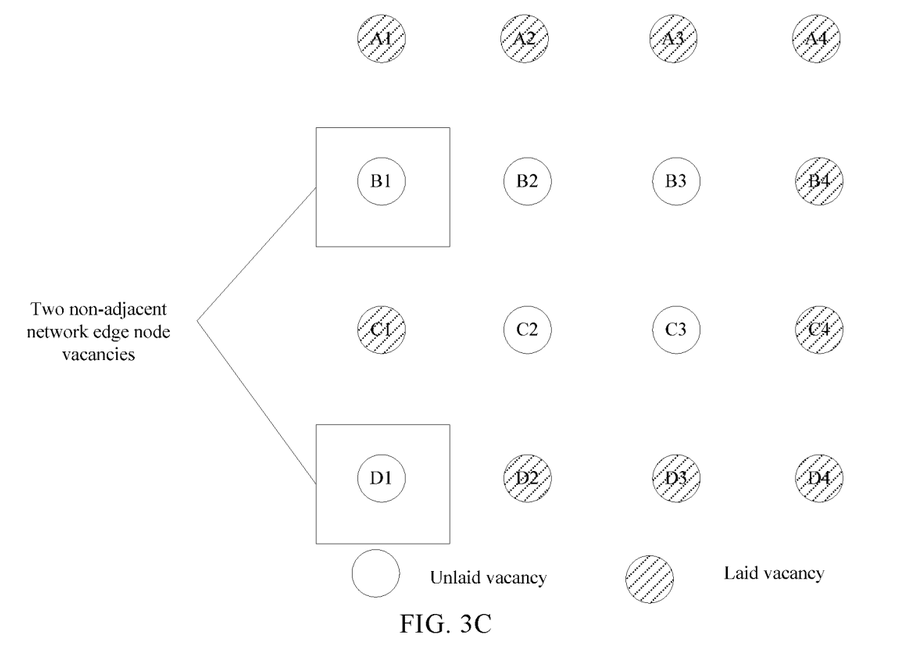
FIG. 3C is another schematic diagram of an application scenario of a logical node layout process to which the present disclosure is applicable.

The two non-adjacent network edge node vacancies refers to two network edge node vacancies between which data interaction can be performed only through relay of one or more other network edge nodes. FIG. 3C is another schematic diagram of an application scenario of a node layout process to which the present disclosure is applicable. As shown in FIG. 3C, the two node vacancies B1 and D1 are two non-adjacent network edge node vacancies.

If more than two non-adjacent network edge node vacancies are detected in the current unlaid node vacancies, the two non-adjacent network edge node vacancies may be selected randomly, or clockwise or counterclockwise taking a set node vacancy as a reference fixed point, for layout of the current source node and the current target node.

At S290, laying out the current source node and the current target node in the two non-adjacent network edge node vacancies, and proceeding to S2140.

The layout method may include laying out the current source node first and then the current target node; or laying out the current target node first and then the current source node; which is not limited in this embodiment.

At S2100, judging whether there is only one network edge node vacancy, if there is only one network edge node vacancy, proceeding to S2110; otherwise, proceeding to S2120.

Further, if it is determined that there isn't two non-adjacent network edge node vacancies, it is impossible for the current source node and the current target node to be both laid out in network edge node vacancies, and at this time, it may be further judged whether there is only one network edge node vacancy, so as to ensure that the layout is further performed inside of the transmission network after all the network edge vacancies in the transmission network are occupied.

At S2110, laying out one of the current source node and the current target node in the only one network edge node vacancy, and laying out the other one of the current source node and the current target node in a network non-edge node vacancy closest to the only one network edge node vacancy, and proceeding to S2140.

If it is determined that there is only one network edge node vacancy, one of the current source node and the current target node may be selected to be laid out in the only one network edge node vacancy, and in order to minimize the number of relays between the current source node and the current target node, the other of the current source node and the current target node may be laid out in a network non-edge node vacancy closest to the only one network edge node vacancy.

Figure 3D:
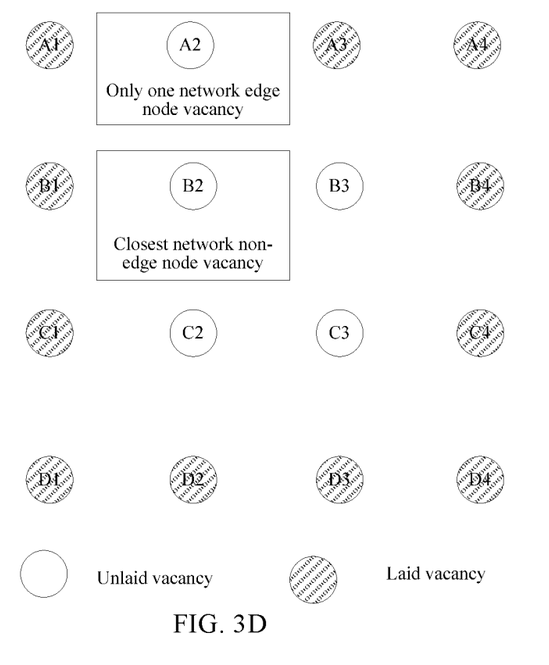
FIG. 3D is another schematic diagram of an application scenario of a logical node layout process to which the present disclosure is applicable.

One vacancy closest to another vacancy specifically refers to the one vacancy with the least number of relays with the other vacancy. FIG. 3D is another schematic diagram of an application scenario of a node layout process to which the present disclosure is applicable. As shown in FIG. 3D, before the layout of the current source node and the current target node, only one network edge node vacancy A2 is found. At this time, one of the current source node and the current target node is laid out at A2, while one of the network non-edge node vacancies B2, B3, C2 or C3, which has the least number of relays with A2, is selected for layout of the other one of the current source node and the current target node. Apparently, direct communication may be performed between B2 and A2 without any relay, one relay (via A3 or B2) is needed between B3 and A2 for data interaction, one relay (via B2) is needed between C2 and A2 for data interaction, and two relays (via C3->C2->B2->A2 or C3->B3->A3->A2) are needed between C3 and A2 for data interaction. Therefore, B2 is the node vacancy with the least number of relays with (closest to) A2, and thus, A2 and B2 may be selected for layout of the current source node and the current target node.

At S2120, laying out the current source node and the current target node according to a positional relation between unlaid node vacancies and network edge node vacancies, and proceeding to S2140.

Specifically, if all network edge node vacancies are laid out with nodes, the current source node and the current target node need to be laid out along the direction from network edge node vacancies towards network central node vacancies. It will be appreciated by those skilled in the art that the nodes may be laid out in any manner along the direction from edge positions towards central positions.

For example, all the network edge node vacancies that have been laid may be shielded first, then new network edge node vacancy(s) is(are) determined in the transmission network, and the new network edge node vacancy(s) is(are) further laid with the previous method; alternatively, a central point matched with a profile of the entire transmission network may be determined, and then the nodes may be arranged in an order from far to near from the central point, which is not limited in this embodiment. S2120 merely shows an optional method of laying out along the direction from network edge node vacancies towards network central node vacancies.

Specifically, the step of laying out the current source node and the current target node according to the positional relation between the unlaid node vacancy and each network edge node vacancy (i.e., step S2120) may include: respectively acquiring a minimum edge distance difference corresponding to each unlaid node vacancy; laying out one of the current source node and the current target node in a unlaid first target node vacancy with the smallest edge distance difference, and laying out the other one of the current source node and the current target node in a unlaid node vacancy closest to the first target node vacancy.

Optionally, before respectively acquiring the minimum edge distance difference corresponding to each unlaid node vacancy, the step further includes: respectively calculating a plurality of distance values between each network non-edge node vacancy and each network edge node vacancy, and acquiring a minimum distance value corresponding to each network non-edge node vacancy as the minimum edge distance difference of the network non-edge node vacancy.

In this optional implementation, a minimum edge distance difference corresponding to each network non-edge node vacancy may be firstly calculated. The minimum edge distance difference specifically refers to a minimum distance between each network non-edge node vacancy and a network edge node vacancy, which may be measured by adding one to the number of relays. For example, as shown in FIG. 3D, if the numbers of relays between the network non-edge node vacancy B2 and each network edge node are 0, 1, 2, 3, and 4, the minimum value 0+1=1 can be obtained as the minimum edge distance difference of B2.

Apparently, the closer the non-edge network node is to the network edge node, the smaller the minimum edge distance difference is. Therefore, the nodes may be laid out in an order of the minimum edge distance difference from small to large, so as to achieve the layout effect desired by the present disclosure.

At S2130, laying out the current target node or the current source node in an unlaid node vacancy matched with the current source node or the current target node that has been laid out, and proceeding to S2140.

As described above, when one of the current source node or the current target node is already laid out in the node vacancy, a layout position of the other node may be determined according to the current source node or the current target node that has been laid out.

Specifically, taking a node that has been laid out as the current source node as an example, if the current source node is laid out in a network edge node vacancy, it is firstly detected whether there is a node laid out in a network edge node vacancy positioned adjacent to that network edge node vacancy. If no node is laid out in that position, the current target node may be laid out in the adjacent network edge node vacancy. If a node is laid out in that position, it may be further detected whether there is an unlaid network edge node vacancy. If there is an unlaid network edge node vacancy, the current target node may be laid out in the network edge node vacancy. If there is no unlaid network edge node vacancy left, the current target node may be laid out in a network non-edge node vacancy closest to the network edge node vacancy where the current source node is laid.

Figure 3E:
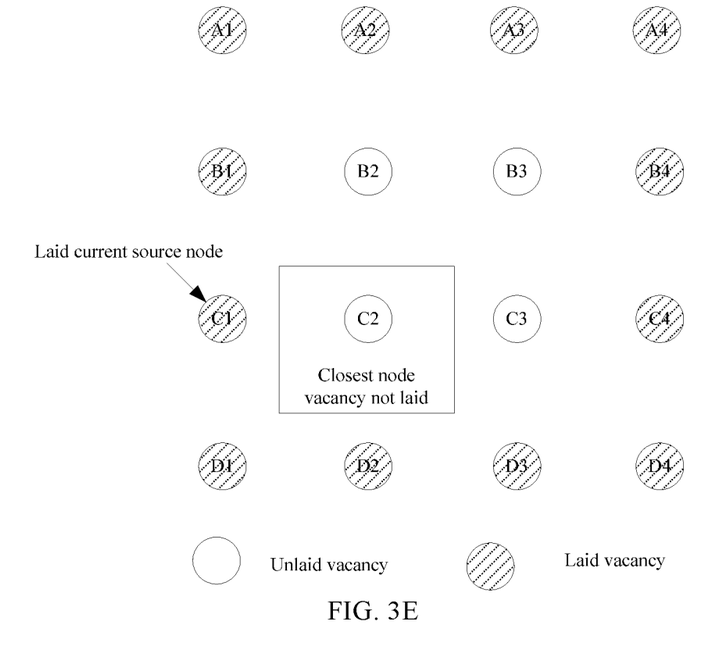
FIG. 3E is another schematic diagram of an application scenario of a logical node layout process to which the present disclosure is applicable.

FIG. 3E is another schematic diagram of an application scenario of a node layout process to which the present disclosure is applicable. As shown in FIG. 3E, after acquiring the current source node and the current target node, it is determined that the current source node has been laid out in the network edge node vacancy C1. At this time, it is firstly detected whether there are nodes laid out in positions B1 and D1, and after determining that these positions are both laid with nodes, it is further detected whether there is an unlaid network edge node vacancy. If it is determined that there is no unlaid network edge node vacancy left, the unlaid node vacancy C2 closest to C1 is selected from the unlaid network non-edge node vacancies for layout of the current target node.

At S2140, judging whether layout of all nodes is completed, if layout of all nodes is completed, ending the process; otherwise, returning to S230.

In the present disclosure, multiple pieces of routing information corresponding to the nodes in the chip are acquired, and in an order with the data transmission amounts of the routing information from large to small, the nodes in the chip are laid out along a direction from network edge node vacancies towards network central node vacancies, and based on the conclusion that a layout position of a node in the network determines a usage frequency of the node in data transmission, an inventive mode for node layout in the chip according to the data transmission amounts of the nodes is proposed, which makes full use of the efficiency of the nodes in the chip, and thus improves the processing efficiency of the whole chip.

Figure 4:
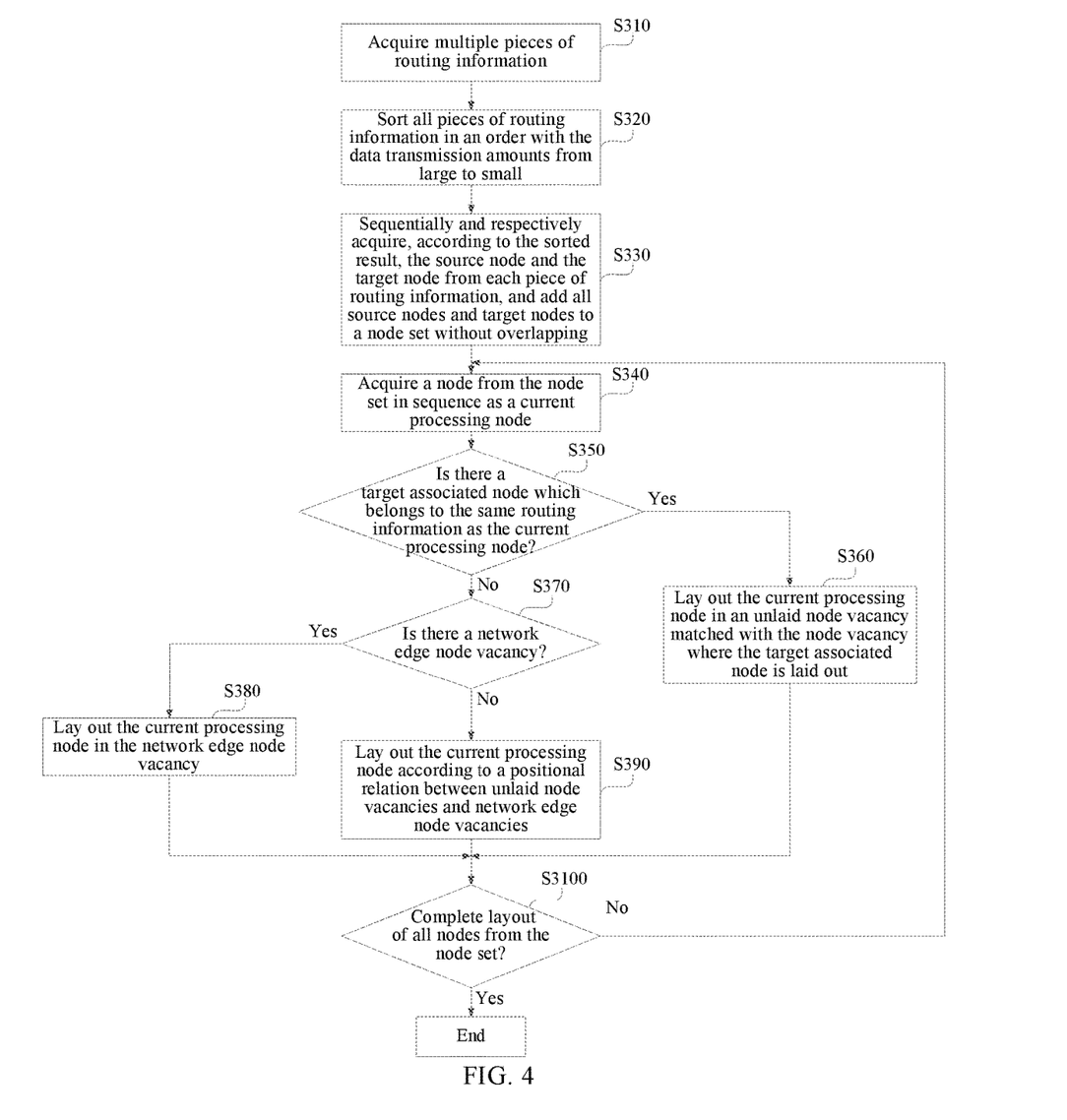
FIG. 4 is another flowchart illustrating implementation of a logical node layout method according to the present disclosure.

FIG. 4 is another flowchart illustrating implementation of a node layout method according to the present disclosure, which is refined on the basis of the above embodiments. In this embodiment, the step of laying out, in an order with the data transmission amounts from large to small, all the nodes along a direction from network edge node vacancies towards network central node vacancies (i.e., step S120) is refined. Accordingly, the method according to the embodiment specifically includes the following steps S310 to S3100.

At S310, acquiring multiple pieces of routing information.

The routing information includes: a source node that sends data, a target node that receives the data, and a data transmission amount.

At S320, sorting all pieces of routing information in an order with the data transmission amounts from large to small.

At S330, sequentially and respectively acquiring, according to the sorted result, a source node and a target node from each piece of routing information, and adding all source nodes and target nodes to a node set without overlapping to obtain a node set corresponding to all the nodes in the chip.

In this embodiment, the node set includes all the nodes in the chip without overlapping, and an order of the node arrangement in the node set also reflects an order of the data transmission amounts of the nodes from large to small. Therefore, by sequentially laying out along the direction from network edge node vacancies to network central node vacancies according to the order of nodes in the node set, the technical effects of the present disclosure can be realized.

The source node and the target node belonging to a same routing information are identified in the node set. The reason for such setting is that when each node from the node set is laid out, if the node belonging to a same routing information as the node to be laid out has been laid out, the node to be laid out may be laid out in a node vacancy close to the node vacancy where the laid out node belonging to the same routing information is located, so as to reduce the number of relays between the two nodes to the maximum extent, and thus improve the processing efficiency of the whole chip.

At S340, acquiring a node from the node set in sequence as a current processing node.

At S350, judging whether there is a target associated node which belongs to a same routing information as the current processing node in the laid node vacancies, if there is a target associated node, proceeding to S360; otherwise proceeding to S370.

At S360, laying out the current processing node in an unlaid node vacancy matched with the node vacancy where the target associated node is laid out, and proceeding to S3100.

In this embodiment, if it is determined that the target associated node in the same routing information as the current processing node has been laid out in a certain node vacancy (for example, node vacancy A), it may be firstly detected whether the node vacancy A is a network edge node vacancy.

If the node vacancy A is a network edge node vacancy, it is further whether there is an unlaid network edge node vacancy adjacent to the node vacancy A. If there is an unlaid network edge node vacancy adjacent to the node vacancy A, the current processing node is directly laid out in the unlaid network edge node vacancy. If there is no unlaid network edge node vacancy adjacent to the node vacancy A, it is further judged whether there is another unlaid network node vacancy. If there is another unlaid network node vacancy, the current processing node is directly laid out in the another unlaid network edge node vacancy. If there is no unlaid network node vacancy, the current processing node may be laid out in an unlaid network non-edge node vacancy closest to the node vacancy A.

If the node vacancy A is not a network edge node vacancy, it is determined that there is no unlaid network edge node vacancy, and at this time, the current processing node may be laid out in an unlaid network non-edge node vacancy closest to the node vacancy A.

S370, judging whether there is a network edge node vacancy: if there is a network edge node vacancy, proceeding to S380; otherwise, proceeding to S390.

At S380, laying out the current processing node in the network edge node vacancy, and proceeding to S3100.

Optionally, if it is determined that among the nodes currently laid out, there is no node belonging to the same routing information as the current processing node, the current processing node may be laid out only along the direction from network edge node vacancies towards network central node vacancies. That is, the current processing node is preferentially laid out in a network edge node vacancy, and if it is determined that there is no network edge node vacancy, the current processing node may be laid out according to a positional relation between unlaid node vacancies and network edge node vacancies.

At S390, laying out the current processing node according to a positional relation between unlaid node vacancies and network edge node vacancies, and proceeding to S3100.

Specifically, the step of laying out the current processing node according to the positional relation between the unlaid node vacancy and each network edge node vacancy (i.e., step S390) may include: respectively acquiring a minimum edge distance difference corresponding to each unlaid node vacancy (network non-edge node vacancy); and laying out the current processing node in an unlaid node vacancy with the smallest edge distance difference.

Optionally, before respectively acquiring the minimum edge distance difference corresponding to each unlaid node vacancy, the step may further include: respectively calculating a plurality of distance values between each network non-edge node vacancy and each network edge node vacancy, and acquiring a minimum distance value corresponding to each network non-edge node vacancy as the minimum edge distance difference of the network non-edge node vacancy.

At S3100, judging whether layout of all nodes from the node set is completed, if layout of all nodes from the node set is completed, ending the process; otherwise, returning to S340.

In the present disclosure, multiple pieces of routing information corresponding to the nodes in the chip are acquired, and in an order with the data transmission amounts of the routing information from large to small, the nodes in the chip are laid out along a direction from network edge node vacancies towards network central node vacancies, and based on the conclusion that a layout position of a node in the network determines a usage frequency of the node in data transmission, an inventive mode for node layout in the chip according to the data transmission amounts of the nodes is proposed, which makes full use of the efficiency of the nodes in the chip, and thus improves the processing efficiency of the whole chip.

In a second aspect, the present disclosure further provides a logical node layout apparatus.

Figure 5:
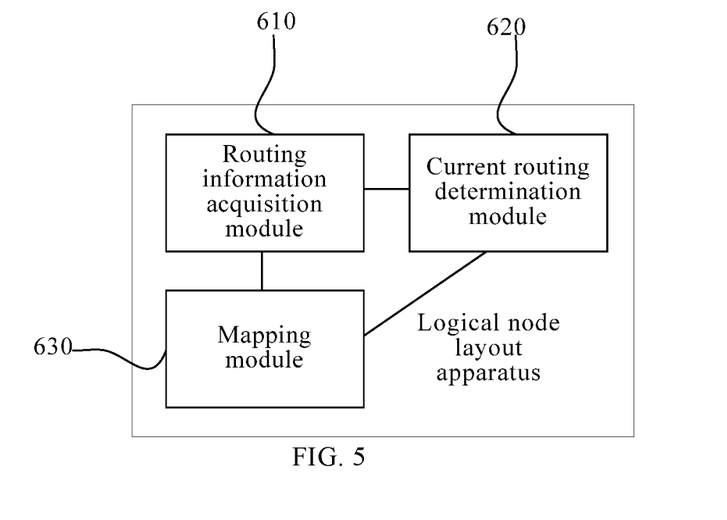
FIG. 5 is a block diagram of a logical node layout apparatus according to the present disclosure.

FIG. 5 is a block diagram of a logical node layout apparatus according to the present disclosure.

The logical node layout apparatus according to the present disclosure is applicable to a many-core system. Among a plurality of processing nodes of the many-core system, the processing nodes located at an edge of a network-on-chip are edge processing nodes, and the remaining processing nodes are internal processing nodes. The apparatus according to the present disclosure includes: a routing information acquisition module 610 configured to acquire multiple pieces of routing information, each of which includes two logical nodes and a data transmission amount between the two logical nodes; a current routing determination module 620 configured to determine a piece of unprocessed routing information with a maximum data transmission amount as current routing information; a mapping module 630 configured to map each unlocked logical node of the current routing information to one unlocked processing node, and lock the mapped logical node and processing node, wherein if there is an unlocked edge processing node, the unlocked logical node is mapped to the unlocked edge processing node. If there is at least one unlocked logical node, the current routing determination module 620 is enable to work.

The logical node layout apparatus according to the present disclosure can execute the logical node layout method according to any embodiment of the present disclosure, and has corresponding functional modules and beneficial effects of the executed method.

In a third aspect, the present disclosure further provides a computer device, including a memory, a processor and a computer program stored in the memory and executable on the processor. The processor, when executing the computer program, implements the logical node layout method according to any embodiment of the present disclosure.

Figure 6:
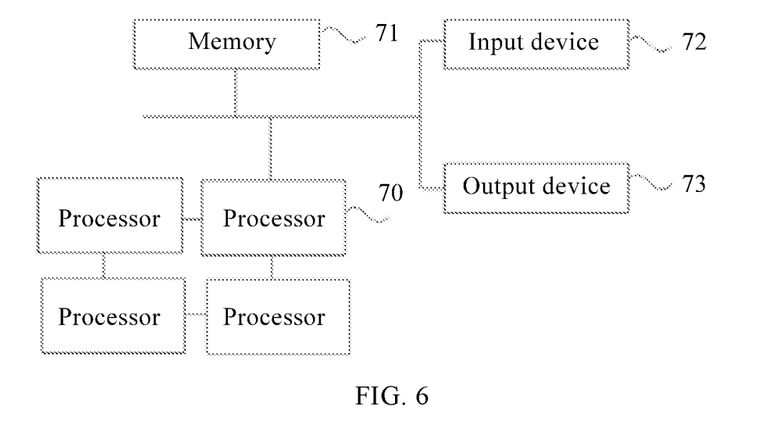
FIG. 6 is a block diagram of a computer device according to the present disclosure.

FIG. 6 is a schematic block diagram of a computer device according to the present disclosure. As shown in FIG. 6, the computer device includes a processor 70, a memory 71, an input device 72 and an output device 73. There may be one or more processors 70 in the computer device, and FIG. 6 takes a case of four processors 70 as an example. The processor 70, the memory 71, the input device 72 and the output device 73 in the computer device may be connected via a bus or by other means, and the connection via a bus is taken as an example in FIG. 6.

The four processors 70 may cooperate to implement the method according to any embodiment of the present disclosure.

The figure shows an internal structure diagram of a processor to which the embodiment of the present disclosure is applicable, where the processor 70 includes one or more nodes (which may be referred to as compute cores). In fact, the desired number of nodes may be set according to actual needs, which is not limited in the embodiment. Each node includes a computation unit and a storage unit. The computation unit is configured to implement core computation in the node, and the storage unit is configured to perform on-chip storage of the computed data in the node.

The memory 71 may mainly include a program storage area and a data storage area. The program storage area may store an operating system, or an application program required for at least one function; and the data storage area may store data created according to the use of the terminal, and the like. Further, the memory 71 may include a high speed random access memory, and may further include a non-volatile memory, such as at least one magnetic disk memory device, flash memory device, or other non-volatile solid state memory devices. In some examples, the memory 71 may further include a memory remotely disposed relative to the processor 70. Such a memory may be connected to the computer device via a network. Examples of such networks include, but are not limited to, the Internet, intranets, local area networks, mobile communication networks, and combinations thereof.

The input device 72 may be configured to receive input numeric or character information and generate key signal inputs relating to user settings and function controls of the computer device. The output device 73 may include a display device such as a display screen.

Figure 7:
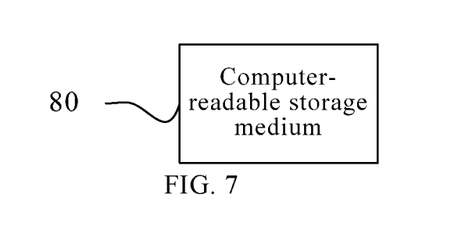
FIG. 7 is a block diagram of a computer-readable storage medium according to the present disclosure.

In a fourth aspect, referring to FIG. 7, an embodiment of the present disclosure further provides a computer-readable storage medium 80 having a computer program stored thereon which, when executed by a processor, causes the logical node layout method according to any embodiment of the present disclosure to be implemented.

Through the description of the above implementations, those skilled in the art can clearly understand that the present disclosure may be implemented by means of software plus necessary general hardware. Obviously, it may also be implemented by hardware, but in most cases, the former is preferable. Based on such understanding, the essential parts of the technical solution of the present disclosure or the parts contributing to the prior art may be embodied in the form of software products. The computer software product may be stored in a computer-readable storage medium, such as a computer floppy disk, a read-only memory (ROM), a random access memory (RAM), a flash memory (FLASH), a hard disk or an optical disk, and includes a plurality of instructions for causing a computer device (which may be a personal computer, a server, or a network device, etc.) to perform the methods described in various embodiments of the present disclosure.

It should be noted that, in the above embodiments of the logical node layout apparatus, each unit and module included are merely divided according to functional logic, but are not limited to the above division, as long as the corresponding functions can be implemented; in addition, the specific names of the functional units are merely for the convenience of distinguishing from each other, and are not intended to limit the protection scope of the present disclosure.

It is to be noted that the foregoing is merely an illustration of the preferred embodiments and principles of the applied technology in the disclosure. Those skilled in the art will appreciate that the present disclosure is not limited to the particular embodiments described herein, and that various obvious changes, rearrangements and substitutions will now be apparent to those skilled in the art without departing from the scope of the disclosure. Therefore, although the present disclosure has been described in some detail by the above embodiments, the disclosure is not limited to the above embodiments, and may include other equivalent embodiments without departing from the concept of the disclosure, and the scope of the present disclosure is determined by the scope of the appended claims.

What is claimed is:

1. A logical node layout method applicable to a many-core system, wherein among a plurality of processing nodes of the many-core system, the processing nodes located at an edge of a network-on-chip are edge processing nodes, and the remaining processing nodes are internal processing nodes, and the method comprises:
   acquiring multiple pieces of routing information, each of which comprises two logical nodes and a data transmission amount between the two logical nodes;
   determining a piece of unprocessed routing information with a maximum data transmission amount as current routing information;
   mapping each unlocked logical node of the current routing information to one unlocked processing node, and locking the mapped logical node and processing node, wherein if there is an unlocked edge processing node, the unlocked logical node is mapped to the unlocked edge processing node; and
   returning, if there is at least one unlocked logical node, to the step of determining the piece of unprocessed routing information with the maximum data transmission amount as the current routing information.

2. The method according to claim 1, wherein in the step of mapping each unlocked logical node of the current routing information to one unlocked processing node, if there is an unlocked edge processing node located at a corner of the network-on-chip, the unlocked logical node is mapped to the unlocked edge processing node located at the corner of the network-on-chip.

3. The method according to claim 1, wherein the step of mapping each unlocked logical node of the current routing information to one unlocked processing node comprises:
   mapping, if the current routing information comprises two unlocked logical nodes, the two unlocked logical nodes to two unlocked processing nodes based on positions of the unlocked processing nodes, respectively; and/or
   mapping, if the current routing information comprises one unlocked logical node and one locked logical node, the unlocked logical node to one unlocked processing node based on a position of the unlocked processing node and a position of the processing node where the locked logical node is located.

4. The method according to claim 3, wherein the step of mapping the two unlocked logical nodes to two unlocked processing nodes based on positions of the unlocked processing nodes comprises:
   mapping, if there are at least two unlocked edge processing nodes, the two unlocked logical nodes to two closest unlocked edge processing nodes, respectively; and/or
   mapping, if there is only one unlocked edge processing node, one of the unlocked logical nodes to the unlocked edge processing node, and mapping the other unlocked logical node to an unlocked internal processing node closest to the unlocked edge processing node; and/or
   mapping, if there is no unlocked edge processing node, the two unlocked logical nodes to two closest unlocked internal processing nodes, respectively.

5. The method according to claim 3, wherein the step of mapping the unlocked logical node to one unlocked processing node based on the position of the unlocked processing node and the position of the processing node where the locked logical node is located comprises:
   mapping, if there is at least one unlocked edge processing node, the unlocked logical node to an edge processing node closest to the processing node where the locked logical node is located; and/or
   mapping, if there is no unlocked edge processing node, the unlocked logical node to an internal processing node closest to the processing node where the locked logical node is located.

6. The method according to claim 1, wherein the unlocked logical node is an unmapped logical node to be mapped, and the unlocked processing node is an empty processing node without any logical node.

7. The method according to claim 1, wherein the unlocked logical node is a preset logical node which is mapped to the processing node in advance, and
   the unlocked processing node comprises a preset processing node with the preset logical node.

8. The method according to claim 7, wherein the step of mapping each unlocked logical node of the current routing information to one unlocked processing node comprises:
   moving, if the unlocked logical node is mapped to the preset processing node with the preset logical node, the preset logical node to another unlocked processing node.

9. The method according to claim 7, wherein the step of mapping each unlocked logical node of the current routing information to one unlocked processing node comprises:
   mapping, if the current routing information comprises two unlocked logical nodes and the two unlocked logical nodes are located in two edge processing nodes spaced by a distance less than or equal to a preset threshold, the two unlocked logical nodes to the edge processing nodes where the two unlocked logical nodes are located, respectively.

10. A logical node layout apparatus applicable to a many-core system, wherein among a plurality of processing nodes of the many-core system, the processing nodes located at an edge of a network-on-chip are edge processing nodes, and the remaining processing nodes are internal processing nodes, and the apparatus comprises:

- a routing information acquisition module configured to acquire multiple pieces of routing information, each of which comprises two logical nodes and a data transmission amount between the two logical nodes;
- a current routing determination module configured to determine a piece of unprocessed routing information with a maximum data transmission amount as current routing information;
- a mapping module configured to map each unlocked logical node of the current routing information to one unlocked processing node, and lock the mapped logical node and processing node, wherein if there is an unlocked edge processing node, the unlocked logical node is mapped to the unlocked edge processing node, if there is at least one unlocked logical node, the current routing determination module is enabled to work.

11. A computer device, comprising a memory, a processor, and a computer program stored in the memory and executable on the processor, wherein the processor, when executing the computer program, implements the logical node layout method according to claim 1.

12. A non-transitory computer-readable storage medium having a computer program stored thereon, wherein the computer program, when executed by a processor, causes the logical node layout method according to claim 1 to be implemented.

* * * * *